Feb. 27, 1968  G. E. CHILDS  3,370,933
LAMP SEALING APPARATUS WITH DOUBLE REVOLVING
AND ORIENTING SEALING HEADS
Filed April 28, 1965  3 Sheets-Sheet 2

INVENTOR.
Gordon E. Childs
BY
ATTORNEY

Feb. 27, 1968
G. E. CHILDS
3,370,933
LAMP SEALING APPARATUS WITH DOUBLE REVOLVING
AND ORIENTING SEALING HEADS
Filed April 28, 1965
3 Sheets-Sheet 3
FIG. 4.
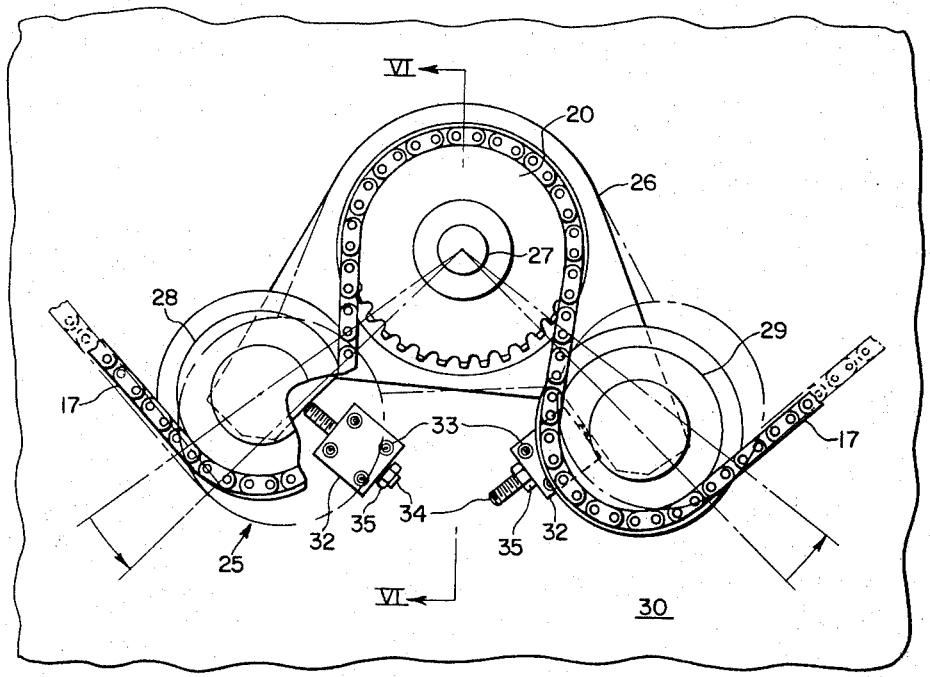
FIG. 6.
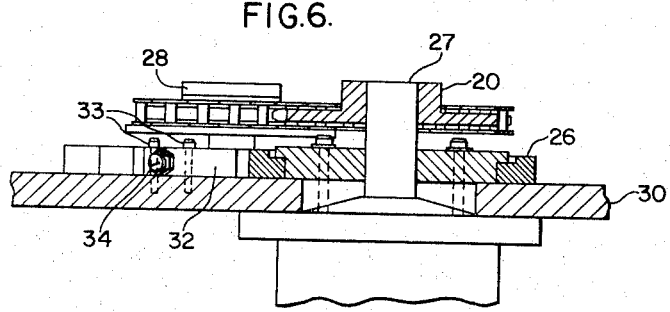
INVENTOR.
Gordon E. Childs
BY 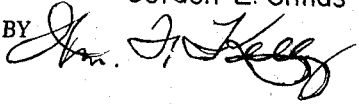
ATTORNEY

United States Patent Office 3,370,933
Patented Feb. 27, 1968

3,370,933
LAMP SEALING APPARATUS WITH DOUBLE REVOLVING AND ORIENTING SEALING HEADS
Gordon E. Childs, Pompton Plains, N.J., assignor to Westinghouse Electric Corporation, Pittsburgh, Pa., a corporation of Pennsylvania
Filed Apr. 28, 1965, Ser. No. 451,382
7 Claims. (Cl. 65—155)

The present invention relates to lamp sealing apparatus and particularly to such apparatus operable with fidelity at a high production rate.

Apparatus of this type has long been known in the art of lamp making wherein the lamp bulb and mount are supported by a head and revolved in proximity to sealing fires so that all parts at the area of seal are acted upon by the fires. Successive indexing of a turret provided with a plurality of such heads accordingly presents the bulb and mount sequentially to the sealing fires of different magnitude and orientation so that fusion of the two glass structures thereby follows. Thereafter, fusion is usually concluded by surrounding the heated and plastic seal area with a mold of suitable shape and applying air pressure to the inside of the lamp envelope to blow the plastic glass outward to conform to the contour of the mold. This molding operation, as well as others such as the loading of the sealing head with the amount structure and glass envelope, are best performed with the sealing head stationary and in predetermined orientation. However, during heating of the glass structures by the sealing fires it has been customary to revolve the heads by a rounded belt engaging a pulley on each sealing head and hence a complicated orientation means is then required to stop each head in the correct orientated position before the mold mechanism can engage the sealed lamp. This produces the highly undesirable result that the sealed envelope is brought to rest while in the sealing fires with undue overheating of the glass envelope at certain limited areas.

In an attempt to increase production rates without decreasing indexing time, apparatus is now in use wherein the number of sealing heads were increased to double their original number and such increased heads indexed two at a time. This, however, has produced many mechanical problems among which are the fact that even though theoretically each head of each pair of sealing heads is identically acted upon, in practice there is a sequential presentation of the heads to the revolving and orientation mechanisms and especially, if dual head orientation means are provided at the molding station, the leading head of a pair must pass through the following head's orientation mechanism to reach its rest position. Of course, these particular mechanical difficulties can be eliminated by the provision of dual revolving and orientation systems in two separate operating planes to achieve desired simultaneous action of the two sealing heads, but this is equivalent to a capital expenditure for two machines rather than increasing the production rate of a single sealing apparatus.

It is accordingly the object of the present invention to provide a sealing apparatus having a production rate substantially double that of previous similar apparatus, and wherein positive simultaneous operations are invariably performed by the sealing heads at their respective indexed stations.

Another object of the present invention is the provision of a sealing apparatus wherein the sealing heads are indexed two at a time to various work stations and wherein both such sealing heads are simultaneously moved and orientated with exactitude and fidelity into proper position.

Another object of the present invention is the provision of a sealing apparatus wherein dual sealing heads are employed which are simultaneously indexed to a plurality of work stations where they perform predetermined operations in absolute synchronization with each other.

A further object of the present invention is the provision of a sealing apparatus utilizing dual sealing heads which remain in synchronized motion during dwell at certain work stations to which they are indexed and wherein they are properly orientated at a rest position after leaving such work stations.

The foregoing objects of the present invention, together with other objects which will become obvious to those skilled in the art from the following description, are achieved by providing a sealing apparatus wherein dual sealing heads are provided which simultaneously index into various work stations upon rotation of their supporting turret. A driving spindle on the turret is provided with a drive gear so disposed between the sealing heads that its drive gear continuously meshes with the operating gear carried by each sealing head spindle thereby assuring the simultaneous synchronized rotation of the dual sealing heads by the drive spindle. A sprocket also affixed to the drive spindle is engaged by a drive chain which is operated at a preselected speed to cause rotation of the drive spindle and hence the dual sealing heads at certain work stations.

Following certain operations at such indexed work stations, the dual rotating sealing heads are then further indexed by the supporting turret to additional stations. Just prior to reaching the first of these latter stations, a locating roller carried by an orientating collar engages a track to prevent rotation of the sealing heads while progressively indexed through a preselected number of additional work stations. A phase adjustment permits setting of the links of the drive chain to assure smooth engagement and disengagement thereof with the sprockets of the drive spindle which together with proper speed regulation of the drive chain so matches the turret velocity at the center line of index that the drive chain engages and disengages the drive spindles without any ensuing shock of any kind.

The present invention can be readily understood by reference to the accompanying drawing wherein:

FIG. 4 is a fragmentary plan view with portions thereof cut away to better illustrate the phase adjustment mechanism shown schematically in FIG. 1;

FIG. 6 is a sectional view taken on the line VI—VI of FIG. 4.

Figure 1:
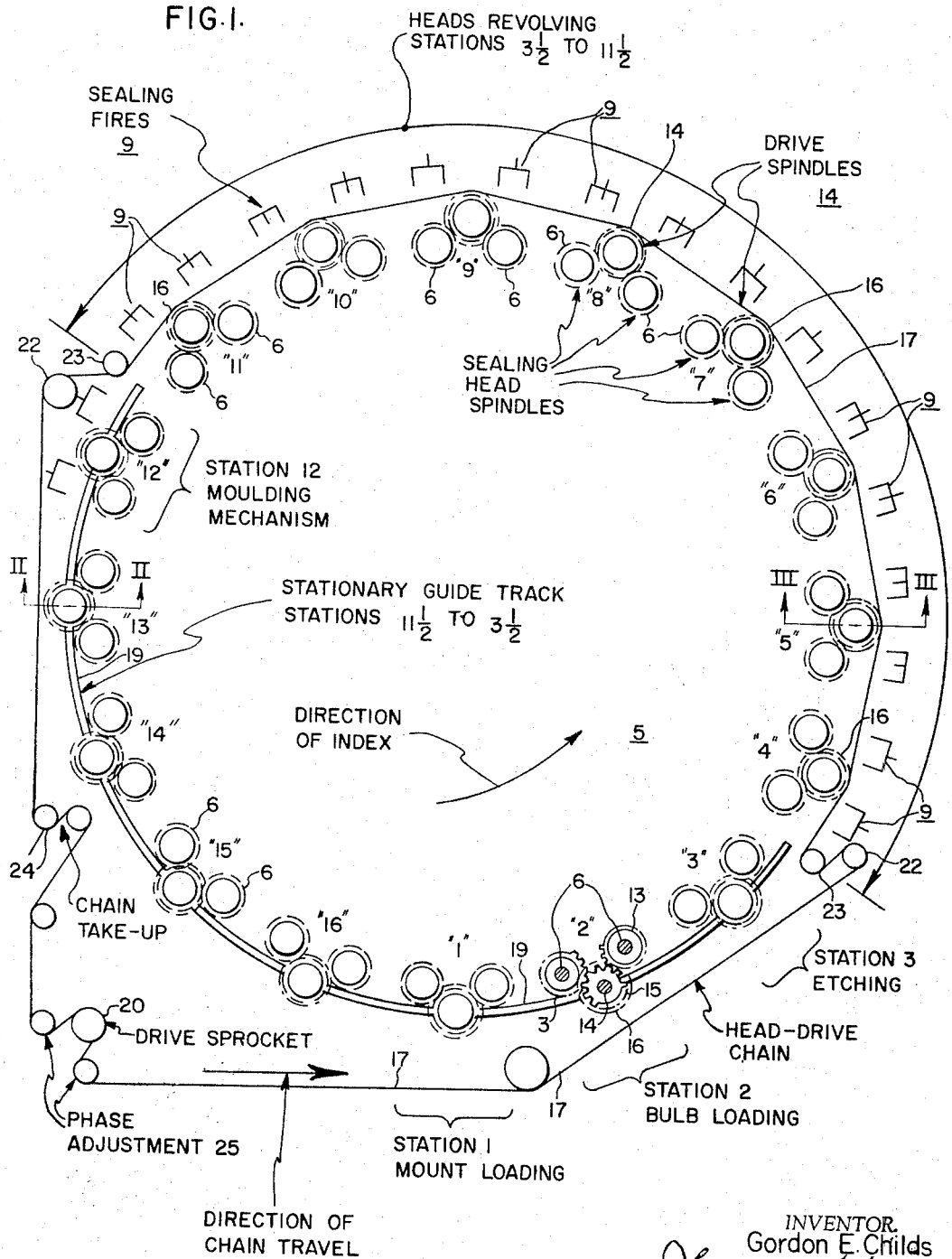
FIGURE 1 is a schematic plan view of the lamp sealing apparatus of the present invention illustrating the various work stations to which the dual sealing heads are progressively indexed by the supporting turret.

Referring now more specifically to the drawings, the present invention as therein shown comprises a supporting turret 5 provided with sixteen groups of dual sealing head spindles 6, as seen in FIG. 1, which are indexible through a plurality of work stations upon intermittent rotation of the turret 5 by mechanism well known in the art. As shown in FIG. 1 by the legends, the mount 7 (FIG. 3) is loaded at station "1" and the bulb 8 at station "2" with the latter being etched, that is, provided with a rating stamp, at station "3." Just prior to reaching station "4" and until they leave station "11," the dual sealing head spindles 6 with their mounts 7 and bulbs 8 carried thereby are revolved, as hereinafter described in detail, and progressively indexed by rotation of the turret 5, so as to position each respective mount 7 and bulb 8 in the path of sealing fires 9 of increasing heat intensity disposed adjacent stations "4" through "11."

Figure 2:
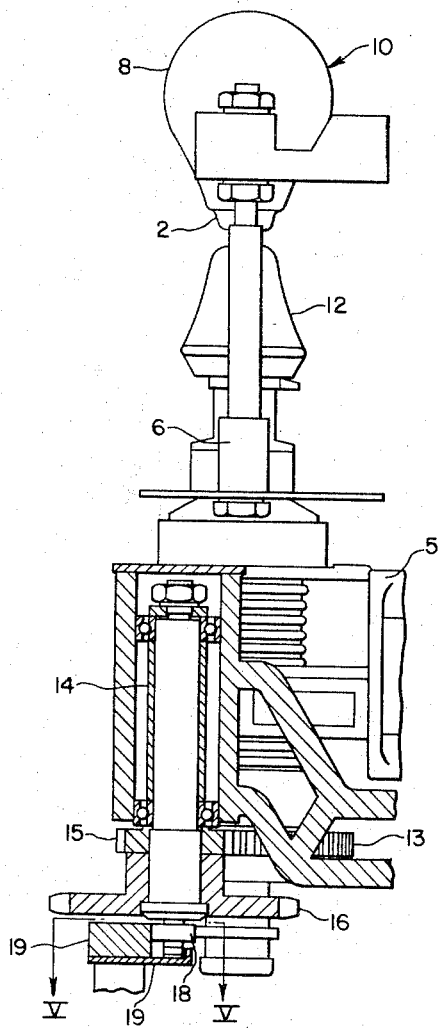
FIG. 2 is a fragmentary elevational view partly in section and taken on the line II—II of FIG. 1.

Between stations "11" and "12," and hence diametrically opposite the point between stations "3" and "4" at which the sealing heads begin to rotate, such sealing heads 6 cease rotation at a predetermined orientated position in which they are indexed into station "12." Here the customary molding mechanism operates to apply pressure to the interior of the heated bulb and blows out the plastic glass to the contour of the mold and completes sealing and forming of the lamp 10 to the shape shown in FIG. 2 with the remaining "cullet" 12 disposed immediately therebelow in the customary manner. Thereafter the formed lamp 10, as held by the stationary sealing head spindles 6, is indexed by the turret 5 through stations "13" to the unloading station "16" to cool such lamp.

Figure 3:
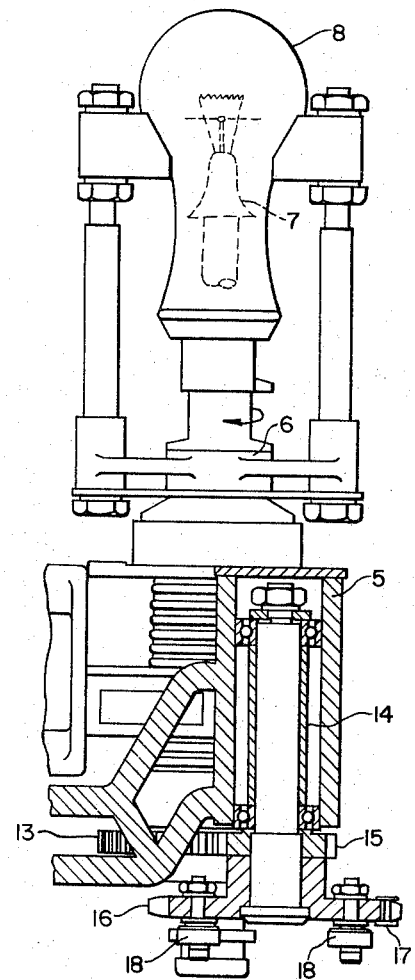
FIG. 3 is a view similar to that of FIG. 2, but taken on the line III—III of FIG. 1.
Figure 5:
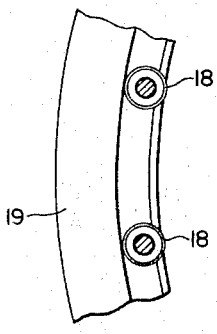
FIG. 5 is a fragmentary view taken on the line V—V of FIG. 2 and looking in the direction indicated by the arrows.

By reference now more particularly to FIGS. 2 and 3, it will be noted that the sealing head spindles 6 are each provided with a spur gear 13 and that an auxiliary drive spindle 14 is disposed between the sealing head spindles 6 which is likewise provided with a spur gear 15 meshing with the spur gear 13 of each pair of sealing head spindles 6. Consequently, upon rotation of the auxiliary drive spindle 14, the dual sealing head spindles 6 will likewise be rotated all in perfect synchronism with each other through the spur gear train. The auxiliary drive spindle 14 is also provided with a sprocket 16 adapted to be engaged by a drive chain or the like 17 which upon rotation thereof drives the auxiliary spindle 14 and hence the sealing head spindles 6, as above noted. A pair of depending locating rollers 18 are disposed adjacent the periphery of the sprocket 16 substantially diametric to each other and are appropriately orientated at the proper time by the drive chain 17, so as to enter and ride upon a stationary semi-circular guide track 19 (FIG. 5) extending peripherically about the turret 5 from what may be termed station "11½" to station "3½" and thus retaining the drive spindles 6 against rotation.

The sealing head drive chain 17, as seen in FIG. 1, which may be an ordinary roller chain, is disposed in a closed loop surrounding the entire turret 5. A drive sprocket 20 connected to a suitable power source moves the chain 17 in the direction of index of the sealing head turret 5, as shown by the arrow in FIG. 1, and at a constant velocity exactly equal to that of the outermost part of the pitch radius of any of the sprockes 16 affixed to the auxiliary drive spindles 14 on the turret 5 at the midpoint of the turret index. A pair of idler sprockets 22 and 23 (FIG. 1) are mounted on the machine table at the locations corresponding to mid-index of the turret 5, namely, adjacent the respective ends of the track 19 between stations "3" and "4" and also between stations "11" and "12." These pairs of idler sprockets 22 and 23 accordingly lead the drive chain 17 tangentially into mesh with the sprockets 16 carried by the drive spindles 14 as the latter are indexed from station "3" to station "4" and out of mesh therewith as such spindles 14 are indexed from station "11" to station "12."

The endless drive chain 17 is also provided with a spring loaded take-up 24 (FIG. 1) for maintaining tautness of the chain in spite of wear, and a phase adjustment 25 surrounds the chain drive sprocket 20 for setting of the chain links so as to present a smooth engagement of the teeth of the sprockets 16 with the chain 17 where the two are brought together. The phase adjustment properly orientates the locating rollers 18 with the track 19 as the spindle 14 ceases rotation after leaving station "11" so that such rollers 18 are properly aligned to ride upon the track 19. The phase adjustment, as shown more clearly in FIGS. 4 and 6, comprises a pivoted yoke or the like 26 journaled about the shaft 27 of the drive sprocket 20 and to the outer ends of which take-up sprockets 28 and 29 are journaled. The machine base 30 is provided with a pair of blocks 32 secured thereto as by screws or the like 33 and an adjustment screw 34 threadedly passes through each of the blocks 32 and bears against the edge of the yoke 26, as seen more clearly in FIG. 4.

Accordingly, upon screwing one of these adjustment screws 34 further into its block 32 and loosening of the other adjustment screw 34 in its block, the yoke 26 is moved slightly clockwise or counterclockwise about the shaft 27 after which the lock nuts 35, carried by each adjustment screw 34, are then tightened to hold the latter in place. Such rotation of the yoke 26 carries with it the two take-up sprockets 28 and 29 which thereupon effectively tightens up the chain 17 on one side of the yoke 26 while letting out the chain on the other side. This adjustment accordingly regulates the phase relationship between the chain 17 and the teeth of the sprockets carried by the drive spindles 14 to assure smooth engagement when they are brought together and also to orientate the spindle rollers 18 relative to the track 19.

The desired number of sealing head revolutions per index are determinable by suitable choice of the gears 13 and 15 between the auxiliary drive spindles 14 and the sealing head spindles 6 with any selection assuring the synchronous rotation of both sealing heads 6 at all times. Also, it is essential that the pitch of the chain 17 be selected so that at the constant linear velocity of the chain determined by the mid-index velocity of the turret, an integral number of chain pitches will pass any given point during one complete index and dwell. The sprocket and gear ratios, and consequently the number of sealing head revolutions per index, are subject to the limitation that in the number of stations where chain and auxiliary drive spindle sprocket are engaged, the total number of head revolutions must be a whole number. In the present embodiment of the invention, this engagement is shown as requiring eight stations resulting in two and one-quarter rotations per index for a total of eighteen revolutions of each sealing head during transit thereof from stations "3½" to "11½" shown in FIG. 1, thereby meeting this essential requirement.

It should thus be readily apparent to those skilled in the art that a lamp sealing apparatus with double revolving and orientating sealing heads has been provided by the present invention, wherein each sealing head operates in complete synchronism with each other. Moreover, the necessity heretofore required of bringing the rotating sealing head to a complete stop while in the hot sealing flame in order to properly orientate it for entry into the molding mechanism has been entirely eliminated. In lieu thereof, uniform heating of the bulb and mount is continued until the sealing heads each pass completely out of the heat zone from the last sealing fire after which such sealing heads are then properly orientated so that their rollers engage a semi-circular track which thereafter maintains the sealing heads, with the sealed lamp then carried thereby, in a fixed position against rotation.

Although one specific embodiment of the present invention has been herein shown and described, it is to be understood that still further modifications thereof may be made without departing from the spirit and scope of the invention.

I claim:

1. A lamp sealing apparatus for sealing electric lamps comprising the combination of:
   (a) an indexible turret provided with pairs of rotatable sealing head spindles spaced about the periphery thereof for supporting an electric lamp mount and envelope and intermittently movable by said turret to a plurality of work stations;
   (b) a drive spindle disposed adjacent each pair of sealing head spindles and connected thereto for causing rotation of said sealing head spindles in synchronism with each other upon operation of said drive spindle;

(c) sealing fires disposed adjacent a predetermined successive number of said work stations and operable to progressively heat said lamp mount and envelope to a fusion temperature as the latter is presented by said sealing heads to said work stations;

(d) orientating means connected to said drive spindle for stopping rotation thereof along with the synchronous rotation of said sealing head spindles at a preselected period of time after said sealing head spindles have passed completely through the last of said successive sealing fire stations;

(e) guide means disposed adjacent a molding work station and several cooling work stations through which said turret indexes and engageable by said orientating means to cause the latter to restrain said drive spindle and sealing head spindles against rotation while said fused lamp mount and envelope are in said molding work station and subsequently pass through said cooling work stations; and (f) drive means connected to said drive spindles for causing operation thereof with attendant synchronous rotation of said sealing head spindles during their entire indexed passage through all of said sealing fires and for causing alignment of said orientating means with said guide means after said sealing heads have completely passed through the last successive sealing fire station and before entering said molding work station.

2. A lamp sealing apparatus for sealing electric lamps comprising the combination of:

(a) an indexible turret provided with pairs of rotatable sealing head spindles spaced about the periphery thereof for supporting an electric lamp mount and envelope and intermittently movable by said turret to a plurality of work stations;

(b) a drive spindle having a sprocket gear and disposed adjacent each pair of sealing head spindles and positively connected thereto by a spur gear train for causing rotation of said sealing head spindles in complete synchronism with each other upon operation of said drive spindle;

(c) sealing fires disposed adjacent a predetermined successive number of said work stations and operable to progressively heat said lamp mount and envelope to a fusion temperature as the latter is presented by said sealing heads to said work stations;

(d) orientating means connected to said drive spindle for stopping rotation thereof along with the synchronous rotation of said sealing head spindles at a preselected period of time after said sealing head spindles have passed completely through the last of said successive sealing fire stations;

(e) guide means disposed adjacent a molding work station and several cooling work stations through which said turret indexes and engageable by said orientating means to cause the latter to restrain said drive spindle and sealing head spindles against rotation while said fused lamp mount and envelope are in said molding work station and subsequently pass through said cooling work stations; and (f) drive means connected to said drive spindles for causing operation thereof with attendant synchronous rotation of said sealing head spindles during their entire indexed passage through all of said sealing fires and for causing alignment of said orientating means with said guide means after said sealing heads have completely passed through the last successive sealing fire station and before entering said molding work station.

3. A lamp sealing apparatus for sealing electric lamps comprising the combination of:

(a) an indexible turret provided with pairs of rotatable sealing head spindles spaced about the periphery thereof for supporting an electric lamp mount and envelope and intermittently movable by said turret to a plurality of work stations;

(b) a drive spindle disposed adjacent each pair of sealing head spindles and connected thereto for causing rotation of said sealing head spindles in synchronism with each other upon operation of said drive spindle;

(c) sealing fires disposed adjacent a predetermined successive number of said work stations and operable to progressively heat said lamp mount and envelope to a fusion temperature as the latter is presented by said sealing heads to said work stations;

(d) aligned rollers supported by said drive spindle for stopping rotation thereof along with the synchronous rotation of said sealing head spindles at a preselected period of time after said sealing head spindles have passed completely through the last of said successive sealing fire stations;

(e) guide means disposed adjacent a molding work station and several cooling work stations through which said turret indexes and engageable by said aligned rollers to cause the latter to restrain said drive spindle and sealing head spindles against rotation while said fused lamp mount and envelope are in said molding work station and subsequently pass through said cooling work stations; and (f) drive means connected to said drive spindles for causing operation thereof with attendant synchronous rotation of said sealing head spindles during their entire indexed passage through all of said sealing fires and for causing alignment of said drive spindle rollers with said guide means after said sealing heads have completely passed through the last successive sealing fire station and before entering said molding work station.

4. A lamp sealing apparatus for sealing electric lamps comprising the combination of:

(a) an indexible turret provided with pairs of rotatable sealing head spindles spaced about the periphery thereof for supporting an electric lamp mount and envelope and intermittently movable by said turret to a plurality of work stations;

(b) a drive spindle disposed adjacent each pair of sealing head spindles and connected thereto for causing rotation of said sealing head spindles in synchronism with each other upon operation of said drive spindle;

(c) sealing fires disposed adjacent a predetermined successive number of said work stations and operable to progressively heat said lamp mount and envelope to a fusion temperature as the latter is presented by said sealing heads to said work stations;

(d) aligned rollers supported by said drive spindle for stopping rotation thereof along with the synchronous rotation of said sealing head spindles at a preselected period of time after said sealing head spindles have passed completely through the last of said successive sealing fire stations;

(e) a semi-circular track disposed adjacent a molding work station and several cooling work stations through which said turret indexes and engageable by said aligned rollers to cause the latter to restrain said drive spindle and sealing head spindles against rotation while said fused lamp mount and envelope are in said molding work station and subsequently pass through said cooling work stations; and (f) drive means connected to said drive spindles for causing operation thereof with attendant synchronous rotation of said sealing head spindles during their entire indexed passage through all of said sealing fires and for causing alignment of said drive spindle roller with said semi-circular track after said sealing heads have completely passed through the last successive sealing fire station and before entering said molding work station.

5. A lamp sealing apparatus for sealing electric lamps comprising the combination of:
  (a) an indexible turret provided with pairs of rotatable sealing head spindles spaced about the periphery thereof for supporting an electric lamp mount and envelope and intermittently movable by said turret to a plurality of work stations;
  (b) a drive spindle having a sprocket gear and disposed adjacent each pair of sealing head spindles and connected thereto for causing rotation of said sealing head spindles in synchronism with each other upon operation of said drive spindle;
  (c) sealing fires disposed adjacent a predetermined successive number of said work stations and operable to progressively heat said lamp mount and envelope to a fusion temperature as the latter is presented by said sealing heads to said work stations;
  (d) orientating means connected to said drive spindle and operable to stop rotation thereof along with the synchronous rotation of said sealing head spindles at a preselected period of time after said sealing head spindles have passed completely through the last of said successive sealing fire stations;
  (e) guide means disposed adjacent a molding work station and several cooling work stations through which said turret indexes and engageable by said orientating means to cause the latter to restrain said drive spindle and sealing head spindles against rotation while said fused lamp mount and envelope are in said molding work station and subsequently pass through said cooling work stations; and
  (f) an endless drive chain extending about said indexible turret and operable at a predetermined speed into meshing phase relationship with the sprocket gear of each said drive spindle for causing operation thereof with attendant synchronous rotation of said sealing head spindles during their entire indexed passage through all of said sealing fires and for causing alignment of said orientating means with said guide means after said sealing heads have completely passed through the last successive sealing fire station and before entering said molding work station.

6. A lamp sealing apparatus for sealing electric lamps comprising the combination of:
  (a) an indexible turret provided with pairs of rotatable sealing head spindles spaced about the periphery thereof for supporting an electric lamp mount and envelope and intermittently movable by said turret to a plurality of work stations;
  (b) a drive spindle having a sprocket gear and disposed adjacent each pair of sealing head spindles and positively connected thereto by a spur gear train for causing rotation of said sealing head spindles in complete synchronism with each other upon operation of said drive spindle;
  (c) sealing fires disposed adjacent a predetermined successive number of said work stations and operable to progressively heat said lamp mount and envelope to a fusion temperature as the latter is presented by said sealing heads to said work stations;
  (d) aligned rollers supported by said drive spindle for stopping rotation thereof along with the synchronous rotation of said sealing head spindles at a preselected period of time after said sealing head spindles have passed completely through the last of said successive sealing fire stations;
  (e) a semi-circular track disposed adjacent a molding work station and several cooling work stations through which said turret indexes and engageable by said aligned rollers to cause the latter to restrain said drive spindle and sealing head spindles against rotation while said fused lamp mount and envelope are in said molding work station and subsequently pass through said cooling work stations; and
  (f) an endless drive chain extending about said indexible turret and operable at a predetermined speed into meshing phase relationship with the sprocket gear of each said drive spindle for causing operation thereof with attendant synchronous rotation of said sealing head spindles during their entire indexed passage through all of said sealing fires and for causing alignment of said drive spindle rollers with said semi-circular track after said sealing heads have completely passed through the last successive sealing fire station and before entering said molding work station.

7. A lamp sealing apparatus for sealing electric lamps comprising the combination of:
  (a) an indexible turret provided with pairs of rotatable sealing head spindles spaced about the periphery thereof for supporting an electric lamp mount and envelope and intermittently movable by said turret to a plurality of work stations;
  (b) a drive spindle having a sprocket gear and disposed adjacent each pair of sealing head spindles and positively connected thereto by a spur gear train for causing rotation of said sealing head spindles in complete synchronism with each other upon operation of said drive spindle;
  (c) sealing fires disposed adjacent a predetermined successive number of said work stations and operable to progressively heat said lamp mount and envelope to a fusion temperature as the latter is presented by said sealing heads to said work stations;
  (d) aligned rollers supported by said drive spindle for stopping rotation thereof along with the synchronous rotation of said sealing head spindles at a preselected period of time after said sealing head spindles have passed completely through the last of said successive sealing fire stations;
  (e) a semi-circular track disposed adjacent a molding work station and several cooling work stations through which said turret indexes and engageable by said aligned rollers to cause the latter to restrain said drive spindle and sealing head spindles against rotation while said fused lamp mount and envelope are in said molding work station and subsequently pass through said cooling work stations;
  (f) an endless drive chain extending about said indexible turret and operable at a predetermined speed into meshing phase relationship with the sprocket gear of each said drive spindle for causing operation thereof with attendant synchronous rotation of said sealing head spindles during their entire indexed passage through all of said sealing fires and for causing alignment of said drive spindle rollers with said semi-circular track after said sealing heads have completely passed through the last successive sealing fire station and before entering said molding work station; and
  (g) adjustable means connected to said endless drive chain operable to maintain uniform tautness thereof under operating conditions and for regulating the phase relationship between said endless chain and said drive spindle sprocket gear to assure proper orientation of said aligned rollers with the entrance end of said semi-circular track.

References Cited

UNITED STATES PATENTS

| | | | |
|---|---|---|---|
| 1,641,497 | 9/1927 | France | 65—243 X |
| 1,990,258 | 2/1935 | Trutner | 65—153 X |
| 2,263,126 | 11/1941 | Gray et al. | 65—243 X |
| 2,272,694 | 2/1942 | Drobish | 65—153 X |
| 2,531,008 | 11/1950 | Stuart | 65—272 X |
| 2,565,126 | 8/1951 | Flaws | 65—155 |
| 2,290,798 | 7/1942 | Berthold | 65—243 |
| 3,113,011 | 12/1963 | Gilbert et al. | 65—155 |

DONALL H. SYLVESTER, *Primary Examiner.*

R. L. LINDSAY, *Assistant Examiner.*